United States Patent [19]

Arnone

[11] 4,051,803

[45] Oct. 4, 1977

[54] AIR LEAKAGE INDICATOR DEVICE FOR A SPARE TIRE

[76] Inventor: Charles V. Arnone, 848 Brickell Ave., Miami, Fla. 33131

[21] Appl. No.: 721,701

[22] Filed: Sept. 9, 1976

[51] Int. Cl.² .................. B60C 23/04; G01D 13/04
[52] U.S. Cl. .................. 116/34 R; 73/146.5; 116/114 P
[58] Field of Search .......... 116/34 R, 34 B, 114 P; 73/420, 146.2, 146.3, 146.5, 146.8, 146.4

[56] References Cited

U.S. PATENT DOCUMENTS

| | | | |
|---|---|---|---|
| 2,071,256 | 2/1937 | Dobbs | 73/146.5 X |
| 2,168,145 | 8/1939 | Willis | 73/146.3 X |
| 2,168,690 | 8/1939 | Uksila | 73/146.5 X |
| 2,248,047 | 7/1941 | Addy et al. | 73/146.5 X |
| 2,575,849 | 11/1951 | Steven | 73/146.5 X |
| 2,807,161 | 9/1957 | Wirant | 73/146.2 X |
| 3,462,734 | 8/1969 | Neu | 116/34 R X |

Primary Examiner—Daniel M. Yasich

[57] ABSTRACT

An indicator device positioned in the passenger compartment of an automotive vehicle to warn the operator of the vehicle when the air pressure in a spare tire, disposed in a remote location, is too low for emergency usage.

6 Claims, 5 Drawing Figures

U.S. Patent     Oct. 4, 1977     4,051,803
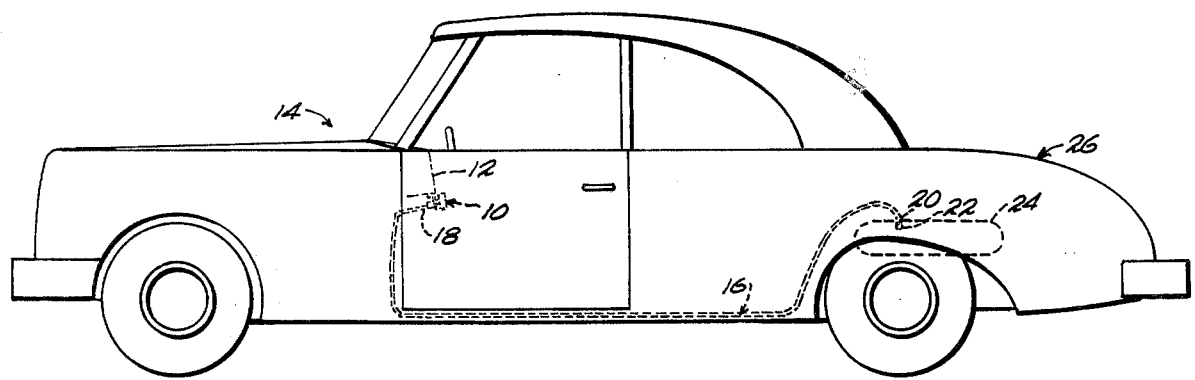
Fig. 1
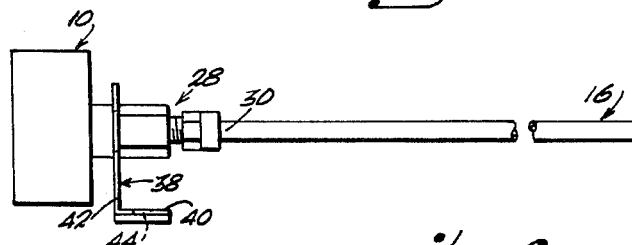
Fig. 2
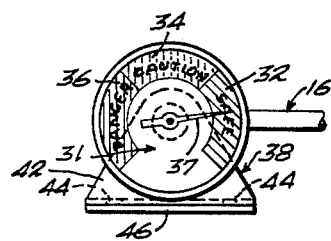
Fig. 3
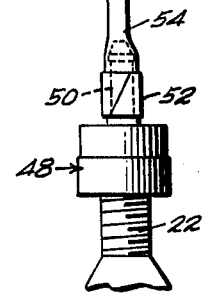
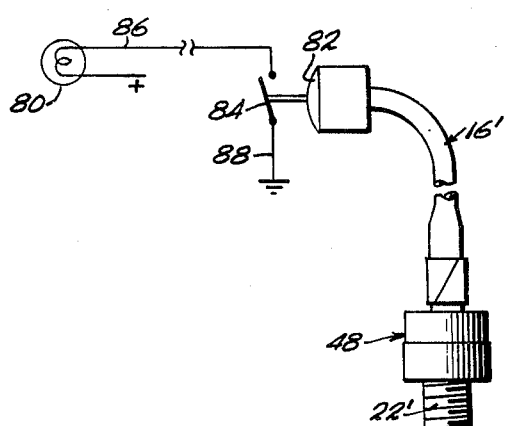
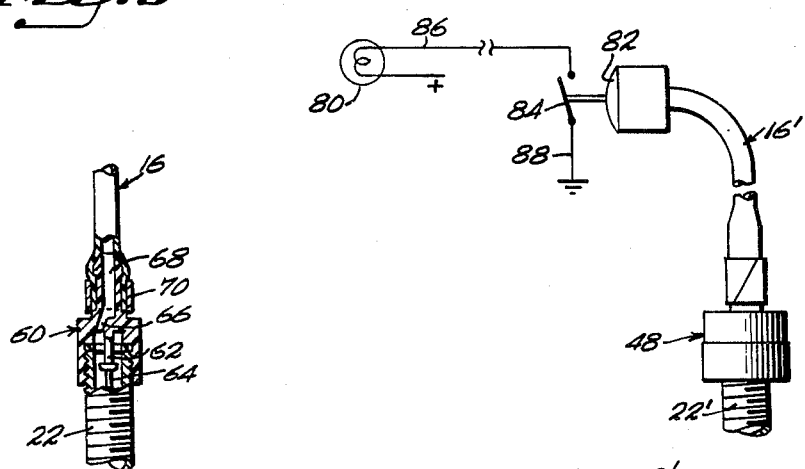
Fig. 4
Fig. 5

AIR LEAKAGE INDICATOR DEVICE FOR A SPARE TIRE

FIELD OF THE INVENTION

The present invention pertains to a leakage indicator for a spare tire of an automotive vehicle, and more particularly to an indicator, of a visual of audible variety, which is disposed in the passenager compartment of an automotive vehicle to warn the operator of the vehicle when the air pressure in the spare tire reaches a level too low for emergency usage on the vehicle.

STATE OF THE PRIOR ART

In general, the prior art patents related to tire pressure indicators of the type which remain at all times in engagement with the valve stem of the tire are for use with the tires currently in use on the vehicle. However, they may be applied to the spare tire which is conventionally stored in a locked luggage or other "out-of-the-way" compartment. Examples of this general type of pressure indicators are U.S. Pat. No. 3,572,283 to Robert B. Ashman, U.S. Pat. No. 3,106,183 to A. Schlanger, and U.S. Pat. No. 2,906,282 to M. L. Shannon. These devices give a visual signal when the air pressure is too low and require close individual observation while mounted directly on the valve stems of the tires.

BACKGROUND OF THE PRESENT INVENTION

Virtually every vehicle operator periodically gets a flat tire in a location remote from a service station or garage. This requires a change to a spare tire. Unfortunately, a great percentage of vehicle operators at one time or another will discover to his or her dismay in such an emergency that the spare tire is also flat or grossly underinflated.

Attendants in service stations, garages and the like rarely ever check the spare tire when checking the "in use" tires unless asked to do so by the vehicle's operator. The operators themselves generally conform with the old saying "out of sight, out of mind." Consequently, the great majority of spare tires go without closely spaced apart pressure checks or are never checked at all until they are actually needed as a replacement for a flat tire.

Pressure indicators of the type disposed directly on the valve stems of spare tires as in the prior art provide no solution to this problem because such indicators are "out of sight" along with the spare tire and the same forethought is required to check the indicators as is required to actually check the air pressure with a pressure gauge.

Therefore, one of the principal objects of the present invention is to provide an indicator means in the passenger compartment of an automotive vehicle which is interconnected with the valve stem of a remotely located spare tire to, at all times, keep the operator of the vehicle informed as to the air pressure condition of the remotely located spare tire.

Another object of the invention is to provide a virtually inescapable visual or audible indicator means in a relatively close proximity to the vehicle operator which immediately informs the vehicle operator when the air pressure in the spare tire reaches a level operator when the air pressure in the spare tire reaches a level which is too low for safe use of the tire.

A further object of the invention is to provide a valve connection from the indicator means to the valve stem of the spare tire which automatically shuts off when the pressure in the tire reaches a predetermined low level, 25 PSI, for example, in the event of leakage between the shut-off valve and the indicator means in the passenger compartment.

BRIEF DESCRIPTION OF THE DRAWINGS:

FIG. 1 is a side elevational view of an automotive vehicle incorporating the spare tire air leakage device of the present invention;

FIG. 2 is an enlarged elevational view of the device removed from the vehicle and attached to the valve stem of a tire;

FIG. 3 is a face view of an air pressure gauge for mounting adjacent a vehicle operator to indicate the air pressure condition in the vehicle's spare tire;

FIG. 4 is a view, substantially in cross section of a modified type of connection to the valve stem of the spare tire; and FIG. 5 is a view similar to FIG. 2, schematically illustrating a further modified form of the invention.

DETAILED DESCRIPTION OF THE DRAWINGS

With reference to the drawings in which like reference characters designate like or corresponding parts throughout the various views and with particular reference to FIG. 1, an indicator means, such as an air guage 10, is illustrated in an attached relation to the dashboard 12 of an automotive vehicle 14. A flexible air conduit 16 connects between air gauge 10 at 18 to a point of connection at 20 to the valve stem 22, FIG. 2, of a spare tire 24 remotely located relative to the air gauge 10 in the luggage compartment 26 of automotive vehicle 14.

With particular reference to FIG. 2, the air gauge 10 is connected in a conventional manner by nut and bolt means 28 to a first end portion 30 of flexible conduit 15 which is preferably in the form of an inexpensive plastic tubing. Air gauge 10 is generally of a conventional type and may include a face dial 31 with graduated numerical indicia to indicate the PSI; however, as illustrated, the dial 31 preferably provides three color segments, lined in FIG. 2 to indicate green, yellow and red areas 32, 34 and 36 to counterclockwisely provide visual "safe", "caution" and "danger" signals by means of an indicator needle 37, said indicia being preferably applied to the respective areas. The three color areas are preferred to the graduated numerical indicia because many vehicle operators, particularly women, are not aware of the proper air pressure for the spare tire.

A bracket 38 is fixed relative to the rear end of air gauge 10 by the nut and bolt means 28. A flange 40 of bracket 38 is bent at right angles to the main body portion 42 thereof and includes hole means 44 for screws and/or a double sided pressure sensitive tape means 46, fixed along the outer face thereof for attachement purposes to the dashboard 12 or to any other convenient portion of the vehicle, adjacent to the normal operator's position.

As further illustrated in FIG. 2, a valve connection 48 is provided to the valve stem 22. The valve 48 is not shown in detail, being of a conventional type which automatically shuts off the escape of air pressure from the system at a predetermined PSI, 25 pounds for example, if an air leakage occurs in the conduit and air gauge assembly 16 and 10. If the air leakage occurs in the spare tire 24, the air pressure will continue to drop to zero. The PSI condition will always be recorded on the dial 31 by needle 37. Valve 48 includes a tubular stem portion 50 for connection by a compression ring 52, to a second end portion 54 of conduit 16.

FIG. 4 illustrates a modification in which a valve stem cap 60 replaces the shut-off valve 48. Cap 60 screws onto the outer end portion of valve stem 22 and includes an inner axially extending pin 62 to depress the air release valve pin 64 of the standard valve core in stem 22 when the cap 60 is applied to said stem 22 as in FIG. 4. The air pressure from the spare tire therefore passes through conduit 16 to the air gauge 10 by means of a communicating port 66 in cap 60. The air pressure in the entire system is balanced relative to the PSI in the spare tire 24 and is so recorded on the gauge dial 31 by indicator needle 37. Cap 60 provides a tubular stem portion 68 for fixed engagement with conduit 16 by a clamp ring 70 in the same manner as described relative to shut-off valve 48.

FIG. 5 illustrates a further modification utilizing a warning light 80 to be positioned relative to the vehicle operator in place of the air gauge 10. In this assembly, either the shut-off valve 48, as illustrated, or the cap structure 60 of FIG. 4 may be interconnected between the valve stem 22' and conduit 16' as above described. The air pressure from spare tire 24 will react on a flexible diaphragm 82 which maintains an electric switch 84 in an open condition when the PSI in the spare tire is in a normal range. When the PSI drops to an unsafe level, the flexible diaphragm 82 permits the switch 84 to close to illuminate the warning light, preferably red in color, by means of the positive and negative leads 86 and 88. It will be apparent that an audible signal such as a buzzer could replace the warning light 80.

With the structure of FIG. 5, a relatively short conduit length 16' can be incorporated in a connecting relation to the diaphragm 82 which along with switch 80 can be conveniently mounted in any conventional manner in a close proximity to the spare tire 24 and a single electrical lead such as 86 would extend from the switch to the light 80 or audible warning means in the passenger compartment. If desired, either the shut-off valve 48 or cap 60 could be provided in a unitary assembly with the diaphragm 82 and switch 84 whereby the air conduit 16' could be eliminated, an air passage would be provided in the assembly from the valve stem to the diaphragm.

What is claimed is:

1. An air leakage indicator device for connection to an inflated spare tire of an automotive vehicle, the spare tire, mounted on a wheel with a valve stem provided with a normally closed valve core, being located in a storage compartment in a remote location relative to the passenger compartment of the vehicle, said air leakage indicator device comprising,
   means including a pointer and a plurality of dial sections to indicate to a person in the passenger compartment of the automotive vehicle if the air pressure in the spare tire is or is not within a safe range for emergency use thereof,
   attachment means removably fixed to the outer end portion of the valve stem of the spare tire, including means on a connection portion of the attachment means and connected to actuate the normally closed valve core of the valve stem to an open condition,
   connecting means comprising a flexible air conduit having first and second end portions, fixedly connected at said first end portion to said valve stem attachment means and at said second end portion to said indicating means.

2. The air leakage indicator device as defined in claim 1 wherein said means to indicate comprises an air gauge.

3. The air leakage indicator device as defined in claim 2 wherein said air gauge includes a face dial with delineated "safe", "caution" and "danger" areas, and an indicator needle, operated by said air pressure in a conventional manner to visually indicate relative to said areas the degree of inflation of the spare tire.

4. The air leakage indicator device as defined in claim 3 wherein said "safe", "caution" and "danger" areas are respectively colored green, yellow and red.

5. The air leakage indicator device as defined in claim 1 wherein said attachment means comprises a shut-off valve, screw-threaded onto said valve stem and being of the type which automatically shuts off the flow of air therethrough at a predetermined, below normal air pressure such as twenty-five PSI.

6. The air leakage indicator device as defined in claim 1 wherein said attachment means comprises a cap, screw-threaded onto said valve stem and including an inner axially extending pin comprising said means to actuate said normally closed valve core to an open condition, said cap including a port communicating between the inner chamber of the spare tire via said valve core and said connecting means.

* * * * *